United States Patent [19]
Iida et al.

[11] 4,265,826
[45] May 5, 1981

[54] METHOD FOR FRACTIONATING AN OIL OR FAT TO SEPARATE THE HIGH MELTING POINT COMPONENTS THEREOF

[75] Inventors: Masaaki Iida; Chihiro Kato, both of Yokohama; Shigemitsu Ohshima, Chigasaki; Yoshiyuki Yazawa, Kawasaki, all of Japan

[73] Assignee: Ajinomoto Company, Incorporated, Tokyo, Japan

[21] Appl. No.: 106,011

[22] Filed: Dec. 21, 1979

Related U.S. Application Data

[63] Continuation-in-part of Ser. No. 962,974, Nov. 22, 1978, abandoned.

[30] Foreign Application Priority Data

Dec. 1, 1977 [JP] Japan ................................ 52/144294

[51] Int. Cl.$^3$ ............................ C09F 5/10; C11B 3/00
[52] U.S. Cl. ........................................ 260/428; 62/532
[58] Field of Search ........................... 260/428; 62/532

[56] References Cited

U.S. PATENT DOCUMENTS

| | | | |
|---|---|---|---|
| 2,205,381 | 6/1940 | Eckey et al. | 260/428 |
| 2,619,421 | 11/1952 | Greenfield | 260/428 |

OTHER PUBLICATIONS

Lutton, E., JAOCS, vol. 27, pp. 276–280 (1950).

*Primary Examiner*—John F. Niebling
*Attorney, Agent, or Firm*—Oblon, Fisher, Spivak, McClelland & Maier

[57] ABSTRACT

A method is provided for fractionating an oil to separate high melting components thereof, which comprises the steps of:

(a) adjusting the temperature of an oil or fat to a temperature from the complete melting point to thirty Celsius degrees above the slip melting point of the oil or fat;
(b) seeding the temperature-adjusted oil or fat with seed crystals of the high melting point components of said oil or fat;
(c) cooling said seeded oil or fat below said temperature to crystallize said high melting point components; and
(d) separating the crystals of said high melting point components from the slurry obtained in step (c).

9 Claims, 2 Drawing Figures

PHOTOGRAPHS OF SEED CRYSTALS
OBTAINED IN EXAMPLE 2
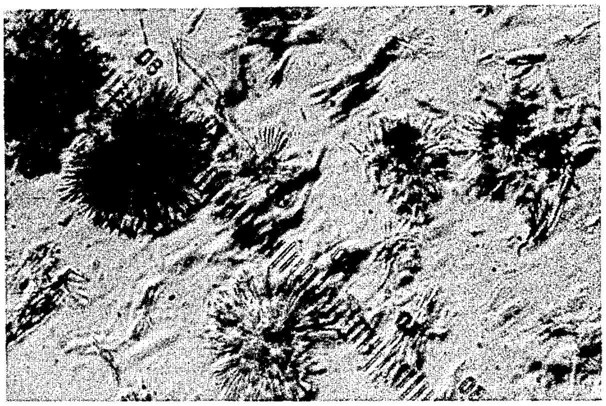
FIG. 1 RADIAL β-CRYSTAL (AS CHESTNUT BUR)
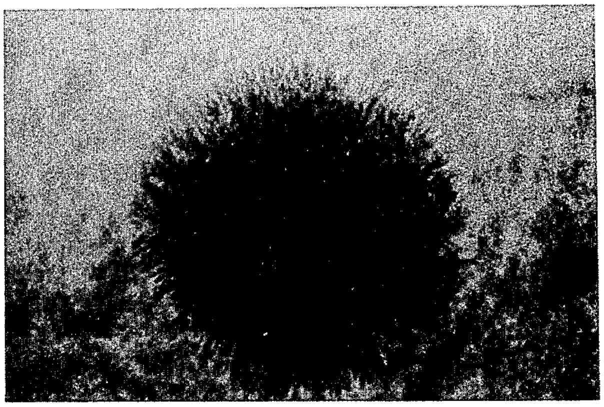
FIG. 2 LARGE RADIAL β′ CRYSTAL (AS AEGAGROPILA)

METHOD FOR FRACTIONATING AN OIL OR FAT TO SEPARATE THE HIGH MELTING POINT COMPONENTS THEREOF

CROSS REFERENCE TO RELATED APPLICATIONS

This application is a continuation-in-part of application Ser. No. 962,974, filed Nov. 22, 1978, now abandoned.

BACKGROUND OF THE INVENTION

1. Field of the Invention

The present invention relates to a method for fractionating an oil or a fat to separate the high melting point components thereof.

2. Description of the Prior Art

It has been found useful to fractionate oils or fats to separate the high melting point components thereof to provide materials which are more useful than the original oils or fats for certain applications, such as the production of margarine.

A classical method for separating the high melting point components of an oil or fat by fractionation is known as "winterization." In this method, the oil or fat is melted, and then gradually cooled, and the crystals formed thereby are separated by filtration. The winterization method is the simplest fractionation method known in the prior art, but the process has certain inherent disadvantages. When an oil or fat is cooled, its viscosity increases, and oils adhere to the crystallized high melting point components. Moreover, the crystals formed in this method are of irregular sizes, and filtration of the crystallized components is therby rendered difficult.

In order to remove the adhered oils from the crystals formed in the winterization method, it is known to wash the crystals with detergents such as sodium lauryl sulfate. But usually the detergents contaminate the high melting point component fraction.

To avoid these disadvantages, solvent fractionation methods using organic solvents have been developed. However, the melting point of the liquid fraction is not as low in these methods, since the solvent does not dissolve a small portion of the high melting point components selectively. In addition, it is necessary to cool the micella to a quite low temperature to crystallize the high melting point components since their concentration in the solution is low. A further disadvantage of the solvent fractionation methods is that a solvent recovery process is required.

A need therefore continues to exist for a method for fractionating an oil or fat to separate high melting point components thereof by crystallization of the high melting components more quickly and in a more controlled crystalline form than in the winterization method, thereby permitting more rapid cooling and faster and more efficient filtration.

SUMMARY OF THE INVENTION

Accordingly, one object of the invention is to provide a method for fractionating an oil or fat by crystallization wherein the size and shape of the crystals of the high melting point components are controlled.

Another object of the invention is to provide a method for fractionating an oil or fat to give a higher yield of separated components.

A further object of the invention is to provide a method for fractionating an oil or fat wherein the crystals of high melting point components thereof may be filtered more quickly and efficiently.

Yet another object of the invention is to provide a method for fractionating an oil or fat wherein crystallization of the high melting point components thereof may be effected in a shorter time than in the winterization method.

A still further object of the invention is to provide a method for fractionating an oil or fat to separate high melting point components thereof which avoids the disadvantages of the winterization method.

Briefly, these objects and other objects of the invention as hereinafter will become more readily apparent can be attained by providing a method for fractionating an oil or fat to separate high melting point components thereof, which comprises the steps of:

(a) adjusting the temperature of an oil or fat to a temperature from the complete melting point to thirty Celsius degrees above the slip melting point of the oil or fat;

(b) seeding the temperature-adjusted oil or fat with seed crystals of thei high melting point components of said oil or fat;

(c) cooling said seeded oil or fat below said temperature to crystallize said high melting point components; and (d) separating the crystals of said high melting point components from the slurry obtained in step (c).

BRIEF DESCRIPTION OF THE DRAWING

A more complete appreciation of the invention and many of the attendant advantages thereof will be readily obtained as the same becomes better understood by reference to the following detailed description when considered in connection with the accompanying drawings, wherein:

FIG. 1 is a photograph of a radial $\beta$-crystal, and

FIG. 2 is a photograph of a large radial $\beta'$-crystal.

DETAILED DESCRIPTION OF THE PREFERRED EMBODIMENTS

In the method of the invention, the oil or fat to be fractionated is melted and the temperature is adjusted to a temperature from the complete melting point to 30 Celsius degrees above the slip melting point of the oil or fat, preferably from the complete melting point to 20 Celsius degrees above the slip melting point of the oil or fat. If the seed crystals are added at a temperature above this range, they dissolve upon addition.

The melting points referenced above are as defined by the American Oil Chemists' Society (A.O.C.S.) as follows:

Slip melting point: A.O.C.S. Official Method Cc 3-25 (Softening Point, Open Tube Method);

Complete melting point: A.O.C.S. Official Method Cc 1-25 (Melting Point, Capilary Tube Method).

Seed crystals of the high melting point components are then added to the temperature-adjusted oil or fat. The seed crystals may be isolated and added in the dry state or they may be added in the form of a slurry. Crystals which have been separated from the oils or fats can be used, but such crystals are sometimes transformed during storage.

It is preferred to add the seed crystals in the form of a slurry of the crystals in the oil or fat from which they were crystallized. Such a slurry can be obtained by cooling a portion of the same oil or fat which is to be fractionated in bulk to form a slurry containing crystals of the high melting point components. The crystals in this slurry are not transformed. The slurry is then added to the temperature adjusted oil or fat in the seeding step.

The amount of seed crystals to be used depends on the amount of the high melting point components in the oil or fat to be fractionated, as well as upon the form or size of crystals desired to be obtained. The optimum amount of seed crystals is determined by preliminary experiment. In general, the amount of seed crystals to be used is from 0.001 to 1 weight percent of the oil or fat, and preferably 0.003 to 0.3 weight percent. This range for the amount of seed crystals added does not depend upon whether isolated crystals or a slurry of crystals is used.

When the amount of the seed crystals is too high, the crystals do not grow into large size suitable for filtration, and when the amount of the seed crystals is too low, oils or fats tend to be supercooled and then undesirable crystals, which are not good in filtration, are produced.

It is desirable that the concentration of high melting point components to be crystallized in the oil or fat to be fractionated ranges from 3 to 80 weight percent.

The seed crystals of high melting point components should preferably be those which promote the formation of crystals which are easy to filter and which retain a minimum of liquid oil. The most preferred seed crystals are radial $\beta$ crystals, shaped like chestnut burrs, radial $\beta'$ crystals and large radial $\beta'$ crystals, which are shaped like aepagropila or hair-balls. The designations "$\beta$" or "$\beta'$" are standard descriptive terms in the art, and are taken from J. Am. Oil Chemists' Soc., 27, 276 (1950), and J. Am. Oil Chemists' Soc., 37, 539 (1960).

It is advantageous to choose a size for, an amount of seed crystals according to the particular oil or fat to be fractionated and in consideration of the cooling rate and other condition variables.

The seeded oil or fat is then further cooled below the seeding temperature to crystallize the high melting point components. Preferably cooling is accompanied by stirring.

By using the process of the present invention, it is possible to surpress the formation of more difficultly filtrable crystals so that they are only formed to a very small extent, even when crystallization occurs at a very low temperature. As a consequence, it is not necessary to cool very slowly as it is in the winterization method. The oil or fat can be cooled rapidly without sacrificing either yield or filtrability. The cooling rate used for the process of the present invention is normally from 0.5° to 10° C./hour, preferably 1.0° to 5° C./hour.

Once the oil or fat has cooled to its fractionation temperature, it is allowed to stand for a while, and then filtered to separate the formed crystals of the high melting point components.

Suitable oils or fats which may be fractionated according to the process of the present invention include animal fats such as lard oil, tallow, fish oil and whale oil, and vegetable oils such as soybean oil, rapeseed oil, peanut oil, cottonseed oil, rice oil, corn oil, and palm oil. It should be understood that the foregoing list of oils or fats is intended to embrace the hydrogenated and/or ester-interchanged forms thereof.

The process of the present invention permits the high melting point components of an oil or fat to be separated by crystallization at a substantially higher temperature than must be used in the solvent fractionation method. There is no solvent removal step in the process of this invention. Shorter cooling times may be used to form the crystals of the high melting point components, and the crystals have substantially improved filtrability compared with crystals formed in the winterization method.

Having generally described this invention, a further understanding can be obtained by reference to certain specific examples which are provided herein for purposes of illustration only and are not intended to be limiting unless otherwise specified.

EXAMPLE 1

Experiment A

A small portion of bleached Malaysia palm oil, having a slip melting point of 39° C., a complete melting point of 42.3° C. and an iodine Value (IV) of 53.1, was heated at 70° C. for one hour, cooled rapidly to 50° C., and then cooled to 30° C. at the rate of 1.7° C./hour, whereby a slurry which contained radial $\beta$-crystals (seed crystals) was obtained. The crystals content in the slurry was about 20 weight percent. The slurry was used for the seeding step below.

Another portion of the bleached Malaysia palm oil was heated at 70° C. for one hour, cooled rapidly to 50° C., then cooled to 45° C. over one hour. The slurry mentioned above was added to the palm oil in the ratio of 0.1 weight percent. Then the slurry was stirred and cooled at the rate of 5° C./hour and maintained at about 30° C. for 12 hours. After having reached solid-liquid equilibrium, the slurry was filtered under reduced pressure. The results are shown in Table 1.

Experiment B

Malaysia palm oil was treated according to the process of Experiment A, except that seed crystals were not added. The results are shown in Table 1. According to Table 1, the shape of the crystals of Experiment B was irregular. The filtrability of the crystals and the yield of the liquid oil of Experiment B were markedly inferior to those of Experiment A.

Experiment C

Malaysia palm oil was treated according to the process of Experiment A, except that seed crystals were not added and the cooling rate was adjusted to 1.7° C./hour. The results are shown in Table 1. According to Table 1, the shape of the crystals, the filtrability of the crystals and the yield of the liquid oil in Experiment C were improved in comparison with those of Experiment B, but inferior to those of Experiment A.

EXAMPLE 2

Experiment D

A small portion of partially hydrogenated rapeseed oil, having a slip melting point of 25.6° C., a complete melting point of 30.2° C. and an IV of 85.5, was heated to 50° C., and cooled to 15° C. over 72 hours, whereby a slurry which contained radial $\beta$-crystals (seed crystals) was obtained. The crystals content in the slurry was about 10 weight percent.

Another portion of partially hydrogenated rapeseed oil was heated at 70° C. for one hour, cooled rapidly to 50° C., then stirred and cooled to 32° C. at a rate of 1.5° C./hour. At 32° C., the slurry prepared above was added to the rapeseed oil in the ratio of 0.1 weight percent, and the seeded oil was cooled to 15° C. at the same rate as above. The slurry was maintained at 15° C. for 12 hours, then filtered under reduced pressure. The results are shown in Table 2.

Experiment E

Partially hydrogenated rapeseed oil was treated according to the process of Experiment D, except that seed crystals were not added and the cooling rate was adjusted to 0.7° C./hour. The results are shown in Table 2. According to Table 2, the shape of the crystals of Experiment E was irregular. The filtrability of the crystals and the yield of the liquid oil of Experiment E were inferior to those of Experiment D.

Photographs of the crystals obtained in the conduct of this Example are shown in the drawing:

FIG. 1 showing a radial β-crystal, shaped like a chestnut burr, and

FIG. 2 showing a large radial β'-crystal, shaped like aegagropila or hair-balls.

EXAMPLE 3

Experiment F

A small portion of cottenseed oil having an IV of 107.2, a slip melting point of 9.6° C. and a complete melting point of 14.4° C. was heated to 50° C., and cooled to 10° C. for 72 hours, whereby a slurry which contained radial β-crystals (seed crystals) was obtained. The crystals content in the slurry was about 10 weight percent.

Another portion of cottonseed oil was heated at 70° C. for one hour, cooled rapidly to 50° C., then stirred and cooled at 20° C. at the rate of 1.5° C./hour. The slurry prepared above was added to the cottonseed oil in the ratio of 0.1 weight percent, and cooled to 5° C. at the same rate as above. The resultant slurry was maintained at 5° C. for 12 hours, then filtered under a reduced pressure. The results are shown in Table 3.

Experiment G

Cottonseed oil was treated according to the process of Experiment F, except that seed crystals were not added and the cooling rate was adjusted to 0.7° C./hour. The results are shown in Table 3.

TABLE 1

| EXPERIMENT | | A | B | C |
|---|---|---|---|---|
| Seeding | | seeded | not seeded | not seeded |
| Cooling rate (°C./hour) | | 5 | 5 | 1.7 |
| Yield of liquid oil (%) | | 83.9 | 67.7 | 80.9 |
| Solid fats | Slip melting point (°C.) | 54.7 | 50.5 | 53.2 |
| | IV | 31.0 | 35.6 | 34.4 |
| Liquid Oils | slip melting point (°C.) | 22.5 | 21.0 | 23.1 |
| | IV | 57.3 | 56.4 | 56.0 |
| Shape of Crystals | | radial β-crystals | large radial β'-crystals and radial β-crystals | radial β-crystals |
| Filtration time* | | 4'50" | 12'10" | 5'45" |

*The time required to filter 1 kilogram of the slurry under a reduced pressure by a 200 cm² filter.

TABLE 2

| EXPERIMENT | | D | E |
|---|---|---|---|
| Seeding | | seeded | not seeded |
| Cooling rate (°C./hour) | | 1.5 | 0.7 |
| Yield of liquid oil (%) | | 91.0 | 76.4 |
| Solid fats | Slip melting point (°C.) | 41.9 | 32.6 |
| | IV | 68.5 | 84.4 |
| Liquid oils | Slip melting point (°C.) | 12.1 | 11.7 |
| | IV | 87.7 | 87.8 |
| Adhesive rate of the liquid oils to the solid fats (%) *2 | | 27.6 | 57.8 |
| Shape of crystals | | radial βcrystals | large radial β'-crystals and radial β-crystals |
| Filtration time *1 | | 6'50" | 20'35" |

*1 The time required to filter 1 kilogram of the slurry under a reduced pressure by a 200 cm² filter.
*2 Calculated by the differential scanning calorimeter.

According to Table 3, the shape of the crystals of Experiment G was irregular. The filtrability of the crystals and the yield of the liquid oil of Experiment G were inferior to those of Experiment F.

TABLE 3

| EXPERIMENT | F | G |
|---|---|---|
| Seeding | seeded | not seeded |
| Cooling rate (°C./hour) | 1.5 | 0.7 |
| Yield of liquid oil (%) | 82.1 | 75.6 |
| Solid fats IV | 89.2 | 91.0 |
| Liquid oil IV | 115.2 | 114.7 |
| Filtration time* | 4'23" | 6'28" |

*The time required to filter 1 kilogram of the slurry under a reduced pressure by a 200 cm² filter.

EXAMPLE 4

A small portion of bleached rapeseed oil having a slip melting point of 20.2° C., a complete melting point of 29.6° C., and an iodine value (IV) of 84.4, was heated at 70° C. for one hour, cooled rapidly to 50° C., and then cooled to 15° C. at the rate of 1.5° C./hour, whereby a slurry which contained radial β-crystals (seed crystals) was obtained. The crystals content in the slurry was about 10 weight percent. The slurry was used for the seeding step below.

Another portion of the bleached rapeseed oil was heated at 70° C. for one hour, cooled rapidly to 50° C., then cooled to the seeding temperature illustrated in Table 4 at the rate of 1.5° C./hour. The slurry mentioned above was added to the rapeseed oil in the ratio of 0.1 weight percent. Then the slurry was stirred and cooled at the rate of 1.5° C./hour and maintained at about 10° C. for 12 hours. After having reached solid-liquid equilibrium, the slurry was filtered under reduced pressure. The results are shown in Table 4.

TABLE 4

| | | This invention | | | The comparison data | |
|---|---|---|---|---|---|---|
| | | 1 | 2 | 3 | 4 | 5 |
| Seeding temp. (°C.) | | 38 | 34 | 32 | 28 | 26 |
| Yield of liquid oil (%) | | 90.3 | 90.4 | 90.4 | 79.4 | 78.1 |
| Solid fats | Skip melting point (°C.) | 36.5 | 38.6 | 37.1 | 33.1 | 32.6 |
| | IV | 69.9 | 68.9 | 69.1 | 84.1 | 85.6 |
| liquid oils | Slip melting point (°C.) | 12.8 | 12.4 | 12.6 | 11.7 | 11.7 |
| | IV | 88.5 | 88.3 | 88.2 | 88.6 | 88.2 |
| Shape of Crystals | | β | β | β | β+ β' | β'+ β |
| Filtration | | | | | | |

TABLE 4-continued

| | This invention | | | The comparison data | |
|---|---|---|---|---|---|
| | 1 | 2 | 3 | 4 | 5 |
| time* | 8'00" | 6'30" | 5'25" | 12'30" | 30'05" |

*The time required to filter 1 kilogram of the slurry under a reduced pressure by a 200 cm$^2$ filter.

Having now fully described this invention, it will be apparent to one of ordinary skill in the art that many changes and modifications can be made thereto without departing from the spirit or scope of the invention set forth herein.

What is claimed as new and intended to be covered by Letters Patent is:

1. A method for fractionating an oil or fat to separate high melting point components thereof, which consists of the steps of:

(a) adjusting the temperature of an oil or fat to a temperature from the complete melting point to thirty Celsius degrees above the slip melting point of the oil or fat;

(b) seeding the temperature-adjusted oil or fat with seed crystals of the high melting point components of said oil or fat, wherein said seed crystals are in the form of raidal $\beta$, radial $\beta'$ or large radial $\beta'$ crystals and are produced by slowly cooling a portion of said oil or fat from a temperature above its slip melting point to a temperature at which crystals of the high melting point components of said oil or fat are formed;

(c) cooling said seeded oil or fat below said slip melting point temperature to crystallize said high melting point components; and (d) separating the crystals of said high melting point components from the slurry obtained in step (c).

2. The process of claim 1, wherein said seed crystals are added as the slurry formed by cooling said portion of oil or fat and containing said crystals.

3. The process of claim 1, wherein the amount of said seed crystals is in the range of from 0.001 to 1 weight percent of said oil or fat.

4. The process of claim 1, wherein the concentration of the high melting point components to be crystallized in said oil or fat is in the range of from 3 to 80 weight percent.

5. The process of claim 1, wherein said oil or fat is an animal oil or fat.

6. The process of claim 5, wherein said animal oil or fat is selected from the group consisting of lard oil, tallow, fish oil and whale oil.

7. The process of claim 1, wherein said oil or fat is a vegetable oil or fat.

8. The process of claim 7, wherein said vegetable oil is selected from the group consisting of soybean oil, rapeseed oil, peanut oil, cottonseed oil, corn oil, rice oil, and palm oil.

9. The process of claim 8, wherein said vegetable oil is palm oil, hydrogenated rapeseed oil or cottonseed oil.

* * * * *